United States Patent
Ghetie

(10) Patent No.: US 7,698,507 B2
(45) Date of Patent: Apr. 13, 2010

(54) PROTECTING SYSTEM MANAGEMENT MODE (SMM) SPACES AGAINST CACHE ATTACKS

(75) Inventor: Sergiu D. Ghetie, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 439 days.

(21) Appl. No.: 11/712,804

(22) Filed: Feb. 28, 2007

(65) Prior Publication Data

US 2008/0209578 A1    Aug. 28, 2008

(51) Int. Cl.
G06F 13/00    (2006.01)

(52) U.S. Cl. .................. 711/138; 711/118; 726/26; 726/27; 726/30

(58) Field of Classification Search ............ 711/118, 711/138
See application file for complete search history.

(56) References Cited

U.S. PATENT DOCUMENTS

| | | | | |
|---|---|---|---|---|
| 5,657,445 | A * | 8/1997 | Pearce | 726/23 |
| 6,401,156 | B1 * | 6/2002 | Mergard et al. | 710/266 |
| 6,711,653 | B1 * | 3/2004 | Quach et al. | 711/146 |
| 2007/0079090 | A1 * | 4/2007 | Rajagopal et al. | 711/163 |

OTHER PUBLICATIONS

First Office Action, Chinese Patent Application Number 200810074189.3, Nov. 6, 2009, 10 pages.

* cited by examiner

*Primary Examiner*—Hetul Patel
(74) *Attorney, Agent, or Firm*—Blakely, Sokoloff, Taylor & Zafman LLP

(57) ABSTRACT

A computing system may comprise a processor and a memory controller hub coupled by an external bus such as the front side bus. The processor may also comprise a cache. The processor may operate in SMM and the memory coupled to the memory controller hub may comprise SMM spaces such as compatible, HSEG, and TSEG areas. A software-based attack may write malicious instructions into the cache at an address corresponding to the SMM spaces. The illegal processor memory accesses that occur entirely inside the processor caches due to the cache attack may be forced to occur on the external bus. The memory controller hub may be capable of handling the memory accesses occurring on the external bus thus, protecting the SMM spaces against cache attack.

20 Claims, 2 Drawing Sheets

PROTECTING SYSTEM MANAGEMENT MODE (SMM) SPACES AGAINST CACHE ATTACKS

BACKGROUND

A computer system typically comprises a processor, chipset, memory, and I/O devices. The processor may operate in a normal mode and a protected mode such as the system management mode (SMM). SMM allows system developers to provide functions such as power management or security, in a manner that is transparent to the operating system (OS) and other application programs. A hardware interrupt referred to the System Management Interrupt (SMI) may initiate the processor to enter SMM.

After receiving the SMI, the processor may store the current execution state referred to as the 'context' to a System Management Random Access Memory (SMRAM) before executing a software routine, such as a SMI handler. The SMRAM may comprise pre-specified memory areas referred to as SMM spaces. While the processor is operating in SMM, an intruder may write a malicious piece of code at an address, which may correspond to the SMI handler. As a result of such cache attacks, the malicious piece of code may take control of the processor.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes a mechanism for protecting the SMM spaces against cache attacks. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, and digital signals). Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
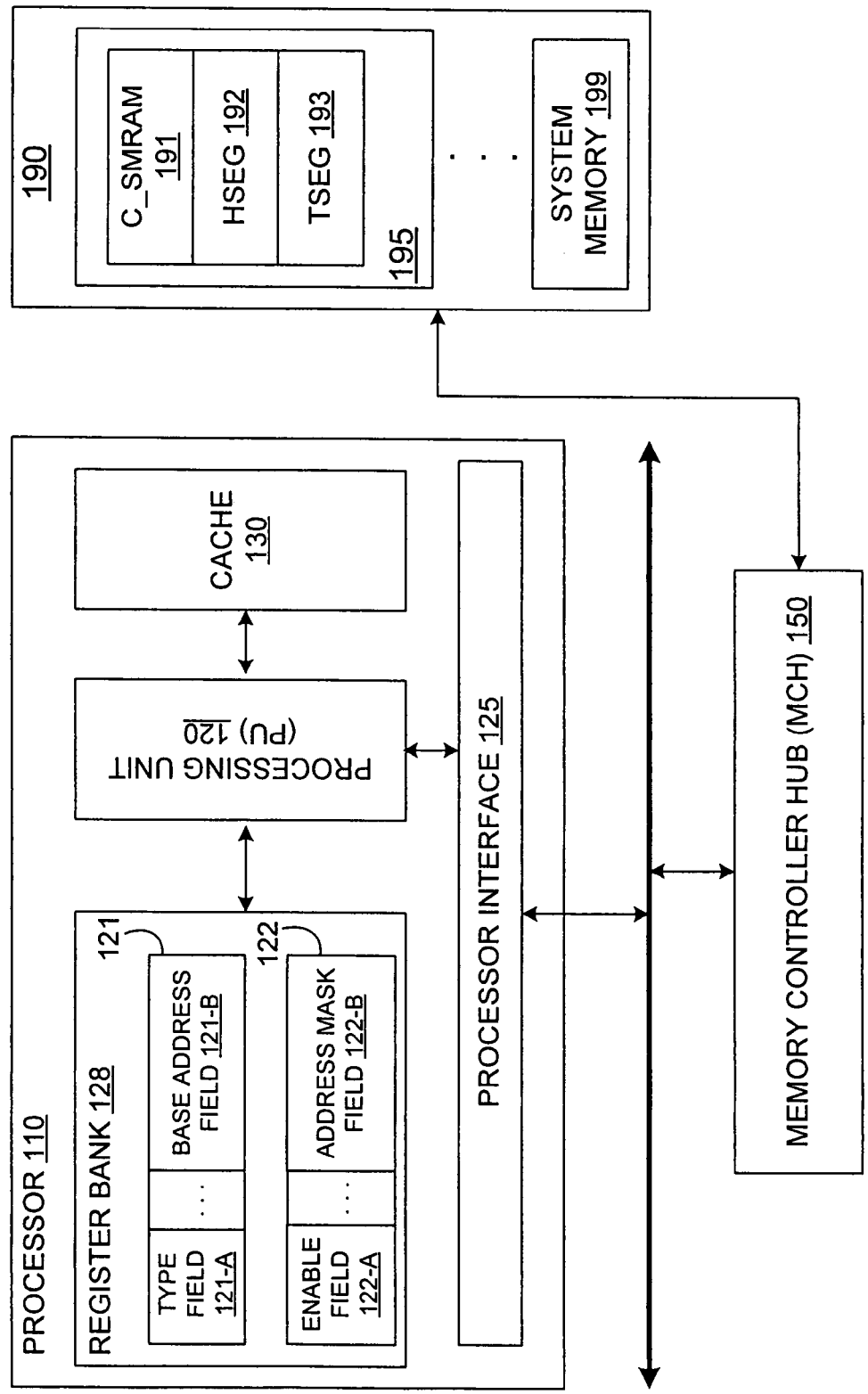
FIG. 1 illustrates an embodiment of a computer system 100.

An embodiment of a computing system 100 is illustrated in FIG. 1. The computing system 100 may comprise a processor 110, a memory controller hub (MCH) 150, and a memory 190.

In one embodiment, the memory 190 may comprise a dynamic random access memory (DRAM) and a static random access memory (SRAM). In one embodiment, the memory 190 may comprise the SMRAM 195, a memory area dedicated for SMM and a system memory 199. The SMRAM 195 may comprise SMM spaces such as a compatible SMRAM area (C_SMRAM) 191, a High segment (HSEG) 192, and a Top of memory segment (TSEG) 193.

In one embodiment, the C_SMRAM 191 may refer to memory locations, which may be at a fixed address within 1 megabyte (MB). The C_SMRAM 191 may be addressed by the processor 110 at the fixed address. In one embodiment, the size of the C_SMRAM 191 may equal 128 kilobytes. In one embodiment, the HSEG 192 may refer to memory locations, which may be at a fixed address within 1 megabyte (MB). The HSEG 192 may be addressed by the processor 110 at an address that is between 1 MB and 4 GB specified by the MCH 192. The size of the HSEG 192 may equal 128 kilobytes.

In one embodiment, the TSEG 193 may refer to memory locations, which may be at a configured address between 1 MB and 4 GB. The TSEG 193 may be addressed by the processor 110 at the configured address that may be between 1 MB and 4 GB. In one embodiment, the size of the TSEG 193 may be of variable size, which may be between 1 MB and 8 MB.

In one embodiment, the processor 110 may comprise a processing unit (PU) 120, a register bank 128, a cache 130, and a processor interface 125. In one embodiment, the processor 110 may be coupled to the memory 190 through the memory controller hub 150. In one embodiment, the processor 110 may represent a Pentium® 4, or Core Duo® processor of Intel® family of microprocessors.

In one embodiment, the processing unit (PU) 120 may communicate with the MCH 150 through the processor interface 125 over a bus such as a front side bus (FSB). In one embodiment, the PU 120 may send SMI acknowledge message to the MCH 150 in response to receiving an SMI or executing a VMCALL instruction from VM root operation. The PU 120 may generate a SMM control signal that may be used to qualify the PU 120 accesses to the SMRAM 195 to store, for example, the internal context after entering SMM. After the context is stored, the PU 120 may execute the SMI handler. In the process of executing the SMI handler, the cache 130 may be loaded with a block of instructions or data from the memory 190. In one embodiment, the execution of the SMI handler may result in performing power management and providing security.

In one embodiment, a cache attack may refer to a software-based attack in which an attacker may write malicious instructions or data into the cache 130 at an address that may be storing the instructions or the data corresponding to SMM space. Such an attack may result in unexpected and undesirable events such as the malicious instructions taking-over the processor 110. In one embodiment, execution of the malicious instructions may result in illegal memory accesses while accessing the cache 130.

In one embodiment, the processor 110 may comprise the register bank 128, which may comprise one or more pairs of registers such as the System Management Mode Memory Type Range Registers (SMM_MTRRs). In one embodiment, the SMM_MTRR's may define the memory type for the physical address ranges and may comprise specific alignment and length requirements for the physical address ranges or memory regions that they describe. The SMM_MTRRs may be used to statically describe the memory types for the physical address ranges within the memory 190. In one embodiment, the page attribute table (PAT) may allow memory types to be dynamically assigned to linearly addressed pages of the memory 190. In one embodiment, the processor 110 may use the classic MTRRs in conjunction with the PAT to combine the extendable and programmable features of the MTRR and the flexibility of the PAT.

In one embodiment, the processor 110 may comprise a pair of SMM_MTRRs in addition to classical MTRRs: a SMM_MTRR_BASE_REG 121 and a SMM_MTRR_MASK_REG 122. In one embodiment, the SMM_MTRR_BASE_REG 121 may comprise two fields referred to as a type field 121-A and an address field 121-B. In one embodiment, the type field 121-A may comprise memory type for both linear and physical-initiated SMM processor memory accesses targeting the SMM space 191-193. The address field 121-B may comprise the base physical address of the SMM space.

In one embodiment, the SMM_MTRR_MASK_REG 122 may also comprise two fields—an enable field 122-A and an address mask field 121-B. In one embodiment, the enable field 122-A may be programmed to a first value to activate the protection mechanism for the SMM spaces and a second value to disable the protection mechanism. In one embodiment, the address mask field 122-B may comprise a physical address mask of the SMM spaces, the C_SMRAM 191, HSEG 192, and TSEG 193. In one embodiment, the PU 120 may configure the SMM_MTRRs 121 and 122 while the processor 110 is operating in current privilege level (CPL) 0. In one embodiment, the PU 120 may configure the SMM_MTRRs based on the BIOS (basic input-output system) such that the MTRR may indicate address range of the SMM space, the type of the SMM space, whether the protection is enabled, and such similar values.

In one embodiment, the processor 110 may provide new memory types referred to as non-coherent strong uncacheable (NCUC) type and non-coherent write-combining (NCWC) type. In other embodiments, the strong uncacheable (UC) memory type may be used if the processor 110 can indicate that it is operating in SMM for memory transactions issued on the external bus.

In one embodiment, the non-coherent strong uncacheable (NCUC) memory type may comprise non-coherent attribute in addition to the cacheability characteristics of the strong uncacheable (UC) memory type. In one embodiment, the cacheability characteristics of the strong uncacheable (UC) memory type may comprise (cacheable: NO, write-back cacheable: NO, and allows speculative reads: NO). In one embodiment, the ordering model for UC may equal strong ordering, in which the transactions are performed in strict order. In one embodiment, the non-coherent attribute may specify that the bus/link agents may not snoop their internal caches, while the memory transactions are observed on the external bus. In one embodiment, the MCH 150 may abort or re-direct the non-coherent memory transactions targeting the SMM space.

In one embodiment, the non-coherent write-combining (NCWC) memory type may comprise non-coherent attribute in addition to the cacheability characteristics of the write-combining (WC) memory type. In one embodiment, the cacheability characteristics of the write-combining (WC) memory type may comprise (cacheable: NO, write-back cacheable: NO, and allows speculative reads: YES). In one embodiment, the ordering characteristic may equal a weak ordering of write memory transactions, which may be accumulated in a write buffer before storing the combined updates to the memory 190. In one embodiment, the non-coherent attribute may specify that the bus/link agents may not snoop their internal caches, while the memory transactions are observed on the external bus. In one embodiment, the MCH 150 may abort or re-direct the non-coherent memory transactions targeting the SMM space.

In one embodiment, the processor 110 may determine the final memory type based on the type of memory access and the configured values in the SMM-MTRR 121 and 122. In one embodiment, the final memory type may determine whether the memory accesses occur on the external bus. In one embodiment, if the final memory type equals NCUC and NCWC, the memory accesses tagged to such memory types occur on the external bus. In one embodiment, if the final memory type equals write-back, the memory accesses may not occur on the external bus. In one embodiment, the final memory type may equal write-back if the processor 110 is operating in cache as RAM (CRAM) mode. In one embodiment, the CRAM mode may ensure that the instructions and data stored in the cache 130 may be from a trusted source. In one embodiment, the strong cryptographic algorithms may be used to authenticate the instructions and data in CRAM.

In one embodiment, the MCH 150 may protect the SMM spaces against illegal processor memory accesses. To protect the SMM spaces, in one embodiment, the memory controller hub (MCH) 150 may support lockable SMRAM configuration registers and control registers. In one embodiment, the lockable configuration registers may enable specific combinations of SMM spaces. In one embodiment, the control registers, which may be partly lockable and partly changeable by the processor 110 operating in SMM may control the occurrence of the data accesses on the external bus such as the FSB.

In one embodiment, while the C_SMRAM 191 is enabled, the MCH 150 may direct the SMM processor memory accesses to the SMM addresses and non-SMM processor memory accesses such as the peripheral component interconnect (PCI) Express and direct media interface (DMI) originated memory accesses to the legacy video area. In one embodiment, while the HSEG 192 is enabled, the MCH 150 may direct SMM and write-back processor memory accesses to the re-mapped SMRAM addresses and abort the non-SMM processor memory accesses.

In one embodiment, while the TSEG 193 is enabled, the MCH 150 may direct SMM and write-back processor memory accesses to the configured SMRAM addresses and abort the non-SMM processor memory accesses. Thus, the MCH 150 may protect the SMM spaces against the illegal memory accesses issued on the external bus. However, the MCH 150 may be unable to protect the SMM spaces against the illegal memory accesses that may occur inside the cache 130 of the processor 110.

In one embodiment, the processor 110 may re-route or force the illegal memory accesses targeting the enabled SMM spaces to occur on the external bus. The MCH 150 may protect the SMM spaces against the cache-attacks after the illegal memory accesses corresponding to the cache-attacks are performed on the external bus.

Figure 2:
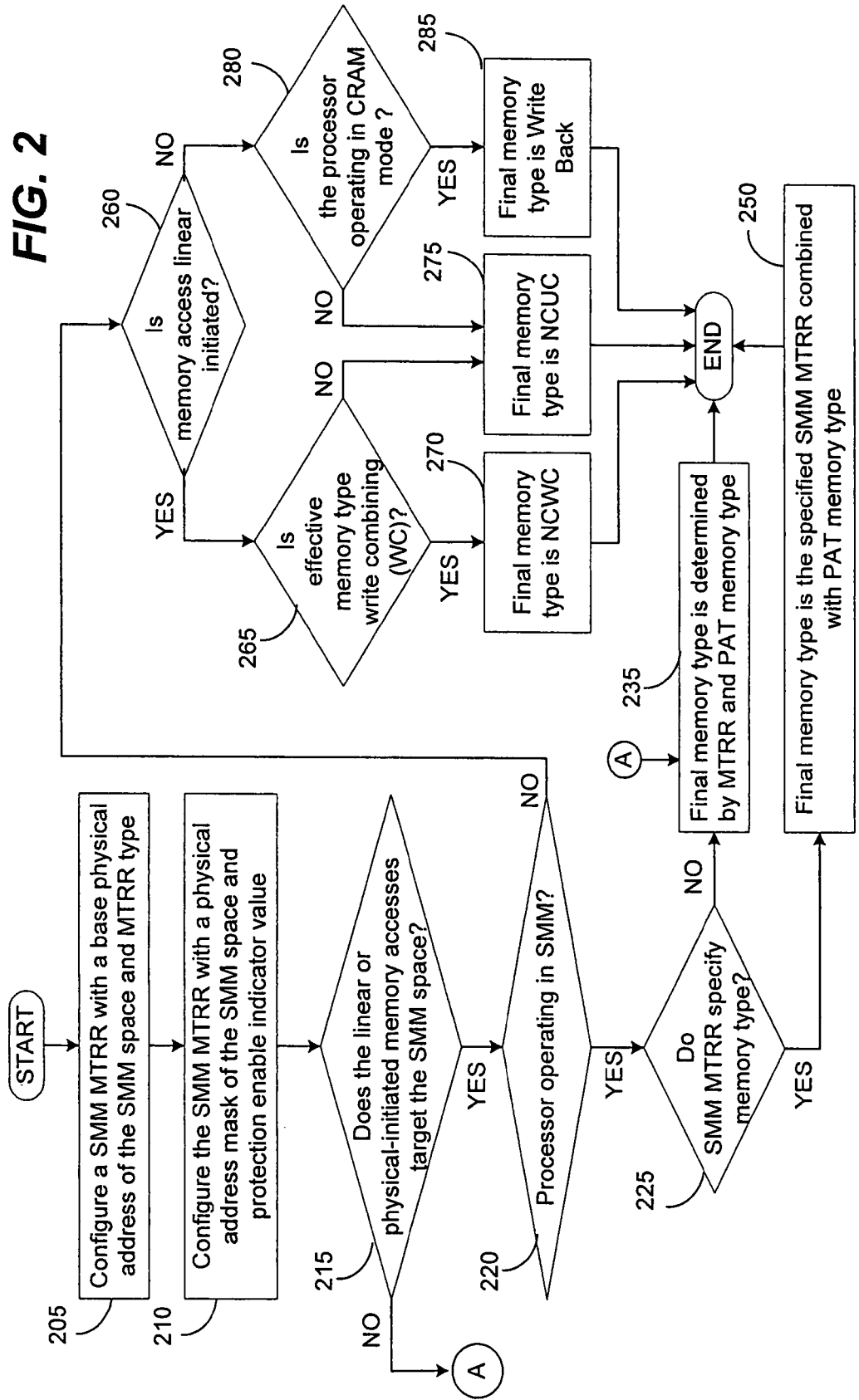
FIG. 2 illustrates an embodiment of the computer system 100 protecting the SMM spaces against cache attacks.

An embodiment of the processor 110 that may force the illegal memory accesses targeting the enabled SMM spaces is described in FIG. 2.

In block 205, the BIOS may configure the SMM_MTRR with a base physical address of the SMM space and MTRR type. In one embodiment, the processor 110 based on the BIOS contents may configure the type field 121-A of the SMM_MTRR_BASE_REG 121 with a memory type such as NCUC, NCWC, UC, and write-back (WB). The BIOS may configure the address field 121-B of the SMM_MTRR-_BASE_REG 121 with a base physical address of the SMM space. For example, the base physical address value may equal the base address of the C_SMRAM 191, or HSEG 192, or TSEG 192.

In block 210, the processor 110 based on the BIOS may configure the SMM_MTRR 121 and 122 with the physical address mask of the SMM space and a protection enable indicator value. In one embodiment, the processor 110 may configure the enable field 122-A of the SMM_MTRR-_MASK_REG 122 with a first logic value to activate the protection mechanism and a second logic value to deactivate the protection mechanism provided to the SMM spaces.

In block 215, the processor 110 may determine whether the linear or physical initiated memory accesses target the SMM space. In one embodiment, the linear memory accesses may refer to memory operations that may use linear addresses, which the processor 110 may translate into physical addresses using the paging mechanism. In one embodiment, the physical-initiated memory accesses may refer to memory accesses performed by the processor directly using the physical addresses.

In one embodiment, the processor 110 may check the enable field 122-A and may determine whether the linear or physical-initiated memory accesses target the SMM spaces if the SMM MTRR pair 121 and 122 is enabled. In one embodiment, the processor 110 may perform a comparison as depicted in Equation (1) below to determine whether the linear or physical-initiated memory accesses target the SMM spaces.

((Physical address targeted by the processor 110) AND (Mask stored in the mask field 122-B of the register 122))=((Address stored in the address field 121-B of the register 121) AND (Mask stored in the mask field 122-B of the register 122)) Equation (1)

In one embodiment, control may pass to block 220 if the condition in Equation (1) is true and to block 235 otherwise.

In block 220, the processor 110 may check if the processor 110 is operating in SMM. In one embodiment, the CPU 120 may determine whether the SMM operation indication signal is asserted. In one embodiment, the assertion of the SMM operation indication signal may indicate that the processor 110 is operating in SMM. Control may pass to block 225 if the processor 110 is operating in SMM and to block 260 otherwise.

In block 225, the processor 110 may determine whether the SMM_MTRR_BASE_REG 121 specifies the memory type and control passes to block 250 if the register 121 specifies the memory type and to block 235 otherwise. In block 235, the processor 110 may determine the final memory type based on the configuration values stored in the classical MTRR registers and the attribute values in the PAT. In block 250, the processor 110 may determine the final memory type based on the configuration values stored in the SMM MTRR register 121 and the page attribute table (PAT).

In block 260, the processor 110 may determine if the memory access is linear initiated and control passes to block 265 if the memory access is linear initiated and to block 280 if the memory access is physical initiated. In one embodiment, the processor 110 may determine whether the memory access is linear-initiated or physical initiated based on the micro-operation (called "uop") type that causes a memory access. In one embodiment, the linear and physical uops may comprise different internal encodings and based on the internal encodings the processor 110 may recognize the linear or physical memory accesses.

In block 265, the processor 110 may determine if the effective memory type is write-combining (WC) and control passes to block 270 if the effective memory type is WC and to block 275 otherwise. In one embodiment, the processor 110 may determine whether the effective memory type is a WC by computing it from the MTRR memory type and PAT memory type.

In block 270, the processor 110 may determine that the final memory type is NCWC. In block 275, the processor 110 may determine that the final memory type is NCUC. In one embodiment, the processor 110 may determine the final memory type based on a set of criteria. In one embodiment, the set of criteria may comprise: the effective memory type, whether the memory addresses target the SMM spaces, whether the processor 110 is operating in SMM, whether the memory access is linear or physical-initiated, and whether the processor 110 is operating in CRAM mode.

In block 280, the processor 110 may determine if the processor 110 is operating in CRAM mode and control passes to block 285 if the processor 110 is operating in CRAM mode and to block 275 otherwise. In one embodiment, the processor 110 may determine whether it is operating in CRAM mode based on a bit in an internal control register. In one embodiment, the processor 110 may set or reset a pre-specified bit of the internal control register while entering and exiting the CRAM mode. In block 285, the processor 110 may determine that the final memory type is write-back (WB).

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A processor comprising:
   a processing unit,
   a register bank, wherein the register bank is coupled to the processing unit,
   a cache memory coupled to the processing unit, and an interface coupled to the processing unit and an external bus, wherein the processing unit is to reroute a memory access targeting a system management mode address range in the cache memory to the external bus if an address of the memory access to the cache memory is equal to a base address stored in a first field of a first memory type register of the register bank and if the processor is operating in a protected system management mode.

2. The processor of claim 1, wherein the first memory type register includes a second field, wherein the second field is to store a memory type value, wherein the memory type value is used to determine a final memory type.

3. The processor of claim 2, wherein the register bank further comprises a second memory type register, wherein the second memory type register includes a mask of the base address and a protection mechanism indicator, wherein the protection mechanism indicator is equal to a first value to operate the processor in the protected system management mode.

4. The processor of claim 2, wherein the processing unit is to determine the memory type based on the memory type value and a page attribute table value, wherein the processor is operating in system management mode.

5. The processor of claim 1, wherein the processing unit is to determine if the memory access is targeting the cache memory area representing system management mode spaces before re-routing the memory accesses on the external bus, wherein the processor is operating in non-system management mode.

6. The processor of claim 5, wherein a memory type is a non-coherent and write-combining type if the memory access targets the cache memory area representing the system management mode spaces.

7. The processor of claim 6, wherein the non-coherent write-combining memory type is to comprise characteristics that re-route the memory access on the external bus and to prevent bus agents from snooping the cache memory, while the memory access is re-routed on the external bus.

8. The processor of claim 5, wherein the memory type is a non-coherent uncacheable type if the memory access targets the cache memory area representing the system management mode spaces.

9. The processor of claim 8, wherein the non-coherent uncacheable type is to comprise characteristics that re-route the memory accesses on the external bus and to prevent bus agents from snooping the cache memory, while the memory access are re-routed on the external bus.

10. The processor of claim 5, wherein the memory type is a write-back type if the memory access targeting the cache memory area are received from a trusted source.

11. A method in a processor comprising:
determining whether a memory access accessing the system management mode area of a cache memory is from a trusted source,
assigning a memory type for the memory access, and
rerouting the memory access targeting system management mode area in the cache memory to an external bus if an address of the memory access to the cache memory is equal to a base address stored in a first field of a first memory type register of a register bank and if the processor is operating in a protected system management mode.

12. The method of claim 11 further comprises configuring a second field of the first memory type register to include a memory type value, wherein the memory type value is used to determine a final memory type.

13. The method of claim 11 further comprises configuring a second memory type register to include a mask of the base address of the system management mode space and a protection mechanism indicator, wherein the protection mechanism indicator is equal to a first value to operate the processor in the protected system management mode.

14. The method of claim 11 comprises determining if the memory access is targeting the cache memory area representing the system management mode area before re-routing the memory accesses on the external bus, wherein the processor is operating in a non-system management mode.

15. The method of claim 14, wherein memory type is a non-coherent and write-combining type if the memory access targets the system management mode area in the cache.

16. The method of claim 15, wherein the non-coherent write-combining memory type is to comprise characteristics that re-route the memory access on the external bus and to prevent bus agents from snooping the cache, while the memory access is re-routed on the external bus.

17. The method of claim 14, wherein memory type is a non-coherent uncacheable type if the memory access targets the system management mode area in the cache.

18. The method of claim 17, wherein the non-coherent uncacheable type is to comprise characteristics that re-route the memory access on the external bus and to prevent bus agents from snooping the cache memory, while the memory access is re-routed on the external bus.

19. The method of claim 14, wherein the memory type is a write-back type if the memory access targeting the cache is received from a trusted source.

20. The method of claim 14 comprises determining the memory type based on the memory type value and a page attribute table value if the processor is operating in system management mode.

* * * * *